United States Patent Office 3,424,275
Patented Jan. 28, 1969

---

3,424,275
DISC BRAKES, IN PARTICULAR FOR AUTOMOBILE VEHICLES
Antoine Brueder, Paris, France, assignor to Societe Anonyme Andre Citroen, Paris, France
Filed Sept. 27, 1966, Ser. No. 582,435
Claims priority, application France, Oct. 6, 1965, 33,953
U.S. Cl. 188—73
Int. Cl. F16d 55/22
2 Claims

ABSTRACT OF THE DISCLOSURE

The brake includes a rotating annular friction disc fastened to a cup-shaped piece, and a stationary frame fastened to a plate lying in the same plane as the disc. The frame comprises two portions disposed symmetrically astride the annular disc from the inside thereof. These two frame portions are secured to each other and to the plate by common fixation means. The friction pads have parallel sides and are guided by corresponding parallel surfaces in the frame portions. One of these pads is located inside the cup-shaped piece, and can be removed therefrom through an opening in the cup-shaped piece, this opening being only slightly longer than the distance between the parallel sides of the friction pads.

---

The present invention relates to disc brakes, in particular for automobile vehicles, which comprise a disc secured through its external edges to the part to be braked, a brake frame mounted on a fixed support and disposed astride of the inner edge of said disc so as to extend over only a part of the circumference thereof, two friction pads mounted on said frame on opposite sides of said disc, respectively, in such manner that each of them can slide with respect to said frame transversely to said disc and means for displacing each of said movable pads with respect to the frame in the direction for which the disc is clamped between the two pads.

The chief object of the present invention is to provide a brake of this kind which is better adapted to meet the requirements of practice than those existing at the present time, in particular concerning the cost of manufacture of the brake and the transmission of the braking stresses to the fixed support.

The present invention consists chiefly in providing the fixed support with a plate disposed at least approximately in the plane of the disc and extending into proximity to the inner edge thereof, in making the brake frame of two portions at least approximately symmetrical with respect to said plane and in fixing these two portions both together and to said plate of the support through the same means.

A preferred embodiment of the present invention will be hereinafter described with reference to the appended drawings, given merely by way of example, and in which.

Figure 1:
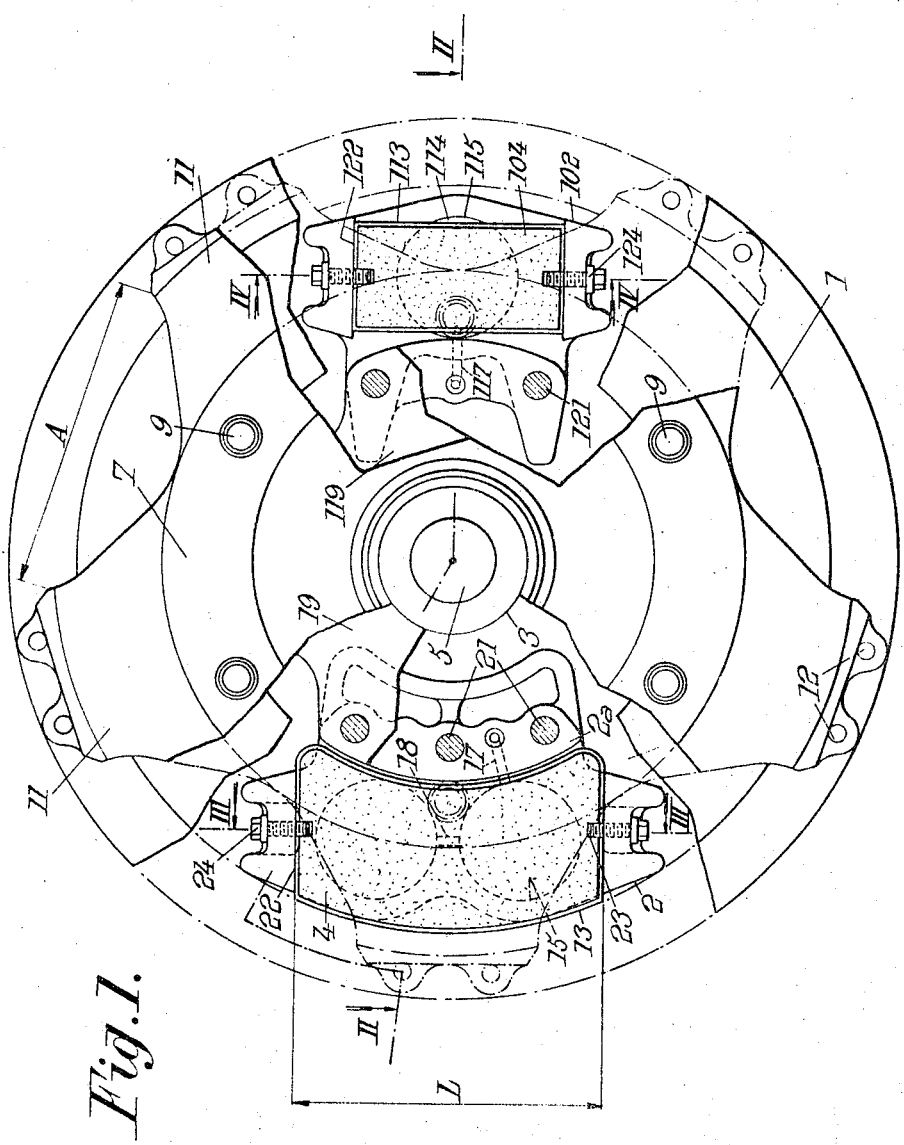
FIG. 1 is an elevational view, with parts in section, of a disc brake made according to the present invention.

The brake comprises the following elements:

A disc 1 having its outer edge connected to the part to be braked;

A brake frame 2 mounted on a fixed support 3 and disposed astride of the inner edge of disc 1 so as to extend over only a portion of the circumference thereof.

Two friction pads 4 disposed in frame 2 so that each of them can slide with respect to said frame transversely to disc 1.

Means capable of moving each pad 4 with respect to frame 2 in the direction which tends to clamp disc 1 tightly between the two pads 4.

Figure 2:
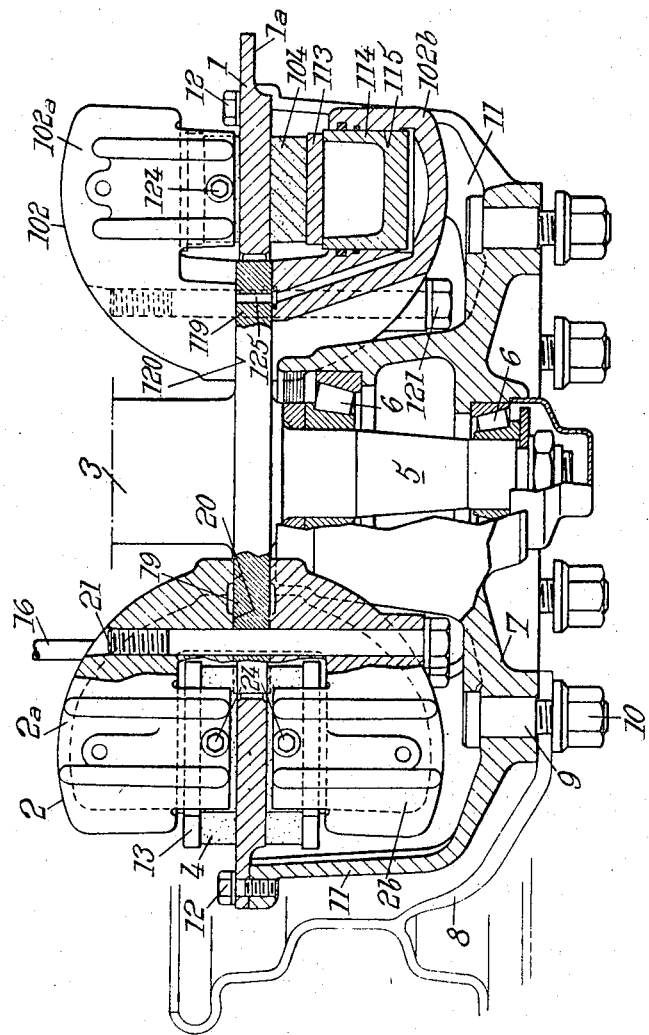
FIG. 2 is a sectional view on the line II—II of FIG. 1.

Support 3 is rigid with a stub axle 5 on which is mounted, through bearings 6, a star-shaped piece 7 on which can be secured a vehicle wheel 8 by means of pins 9 and nuts 10. This wheel constitutes what has been called above the "part to be braked," its hub being constituted by the central portion of star-shaped piece 7. This piece 7 comprises several arms 11, five in the example shown, which are folded transversely with respect to disc 1 (as shown by FIG. 2) and to the ends of which the disc is fixed by means of screws 12. The whole of star-shaped piece 7 and its arms 11 forms a kind of cup-shaped structure. As shown by FIG. 2, disc 1 includes a recessed annular face 1a turned toward arms 11, at the level of screws 12 in order to prevent its warping under the effect of expansion due to the disengagement of heat during the braking periods.

Frame 2 has a C-shaped profile visible on FIG. 2. On every branch of the C is guided, as hereinafter explained, a rigid plate 13 to which is fixed one of the pads 4 and which is adapted to be acted upon by two pistons 14. These pistons slide in cylinders 15, which are provided respectively in the branches of the C and which may be connected with a source of liquid under pressure through a pipe 16 and conduits 17 and 18.

According to the present invention, fixed support 3 comprises a plate 19 disposed, at least approximately, in the plane of disc 1 and extending into close proximity to the inner edge of said disc. Frame 1 is made of two portions 2a and 2b, at least approximately symmetrical with respect to the above mentioned plane and these two portions are secured both together and to the disc 19 of support 3 through the same means. Portions 2a and 2b each comprise bearing faces 20, applied on opposite sides of disc 19, and screws 21, extending through these faces and through disc 19. The heads of screws 21 are preferably located on the side of star-shaped piece 7, that is to say on the outer side of the vehicle. They bear upon the portions 2a of frame 2, whereas their threaded portions are engaged in the other portion 2b of the frame. When there are at least three such screws 21, as shown by the drawing, they are preferably located in a geometrical cylinder coaxial with disc 1.

In order to guide friction pads 4, each portion 2a or 2b comprises two surfaces 22 parallel to a plane passing through the axis of the disc and the center of the corresponding pad 4, said surfaces 22 serving to guide parallel edges of plates 13. In order to maintain plates 13 and pads 4 in the radial direction, said parallel edges are provided with grooves 23 extending parallel to the disc axis and into which are engaged removable projections carried by portions 2a and 2b. These projections consist, in the embodiment shown by the drawing, of screws 24. In order to permit the removal and the replacement of the pads located inside piece 7 after loosening of screws 24, the distance A between two consecutive arms 11 of star-shaped piece 7 (FIG. 1) is slightly greater than the length L of a pad 4 with its plate 13.

Figure 3:
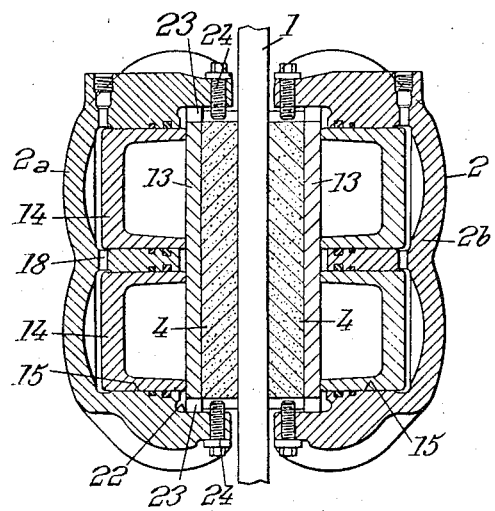
FIG. 3 is a sectional view on the line III—III of FIG. 1.

As shown by FIG. 3, each frame portion 2a and 2b has a C-shaped profile, the inner wall of the two ends of the profile constituting said surfaces 22.

Figure 4:
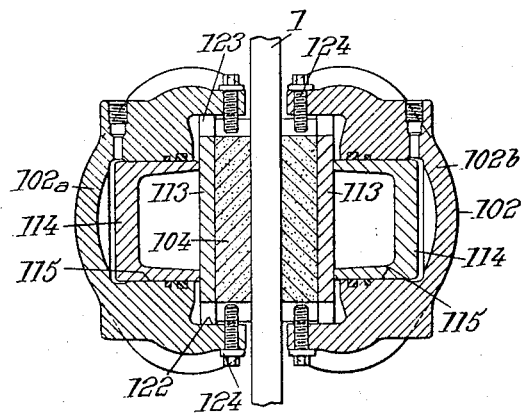
FIG. 4 is a sectional view on the line IV—IV of FIG. 1.

In what precedes there has been described a main brake with pads 4 of relatively large dimensions generally requiring at least two twin pistons 14 and at least three fixation screws 21. In addition to this main brake, it is possible to provide, on the opposite side of the disc, an auxiliary brake preferably of the same structure. This has been shown by FIGS. 1, 2 and 4 where the auxiliary brake elements have been designated by the same reference numerals as those of the main brake with the addition of one hundred. For the auxiliary brake, pads 104 may be of smaller size and they require only one piston 114 for every pad. Two fixation screws 121 are sufficient to secure the two frame portions 102a and 102b to plate 119. FIG. 2 shows that this plate (same as plate 19) may be provided with a conduit 125 for connecting together the cylinders 115 in which pistons 114 are movable.

The operation of the disc brake above described is as follows:

When liquid under pressure is fed to cylinders 15, pistons 14 act upon plates 13 to apply pads 4 against the opposite sides of disc 1. The braking forces are transmitted by plates 13a to the surfaces 22 that correspond to the direction of rotation of the disc and thence, through frame portions 2a and 2b, to disc 19. It will be seen that there is no overhang in the braking reaction since all the efforts are transmitted in the plane of the disc or symmetrically with respect to this plane.

Of course, the operation of the auxiliary brake is the same as that of the main brake.

Another advantage of the brake above described consists in the reduction of its manufacturing cost since the same elements 21 or 121 serve, on the one side, to assemble together the two portions of frame 2 or 102, and, on the other hand, to fix this frame to supporting plate 19 or 119.

Of course, instead of being actuated through hydraulic means, the friction pads, at least those of the auxiliary brake, might be actuated through mechanical means.

What I claim is:

1. A brake for a wheel rotatable with respect to a fixed support, which comprises, in combination:
   a cup-shaped piece rigidly fastened to said wheel for rotation therewith, said cup-shaped piece comprising a plurality of arms extending outwardly, said arms, at least at their outer portion, being directed substantially at right angles to the plane of rotation of said wheel,
   a disc secured to said outer portions of said arms for rotation with said cup-shaped piece and hence with said wheel, said disc being parallel to the plane of rotation of said wheel and being provided with a circular aperture having its center on the axis of rotation of said wheel,
   a circular plate rigid with said fixed support and disposed at least approximately in the plane of said disc, said plate extending outwardly near to the edge of said aperture,
   a stationary brake frame carried by said plate and extending astride of said disc over the inner edge thereof so as to extend over only a part of the circumference thereof,
   two friction pads disposed on opposite sides of said disc, respectively, one of said two pads being located inside said cup-shaped piece,
   said pads having sides which are parallel to each other and parallel to a plane passing through the axis of rotation of said disc and the center of the corresponding pad,
   said arms of said cup-shaped piece being spaced apart, at the level of said pad which is inside said cup-shaped piece, by a distance which is slightly greater than the distance between the parallel sides of said pad which is inside said cup-shaped piece,
   said brake frame having parallel surfaces corresponding to and cooperating with said parallel sides of said friction pads for guiding said friction pads in movement transverse to said disc so that said pads can frictionally engage said disc,
   means for moving each of said friction pads with respect to said brake frame to have said disc caught tightly between said pads,
   each of said guiding surfaces of said pads being provided with grooves transverse to the plane of said disc,
   and screws carried by the frame adapted to engage into said grooves for preventing radial displacements of said pads with respect to said frame and permitting displacements which are transverse to the plane of said disc, each said screw being substantially perpendicular to said guiding sides of said pads, and lying substantially in a plane parallel to the plane of rotation of said wheel, and passing through said frame from the outside thereof to and exceeding the plane of the corresponding guiding surface of said frame, said screws being removable from outside said frame.

2. A brake for a wheel rotatable with respect to a fixed support, which comprises, in combination, a cup-shaped piece rigidly fastened to said wheel for rotation therewith, said cup-shaped piece comprising a plurality of arms extending outwardly, said arms, at least at their outer portion, being directed substantially at right angles to the plane of rotation of said wheel:
   a disc secured to said outer portions of said arms for rotation with said cup-shaped piece and hence with said wheel, said disc being parallel to the plane of rotation of said wheel and being provided with a circular aperture having its center on the axis of rotation of said wheel,
   a circular plate rigid with said fixed support and disposed at least approximately in the plane of said disc, said plate extending outwardly near to the edge of said aperture,
   a stationary brake frame carried by said plate and extending astride of said disc over the inner edge thereof so as to extend over only a part of the circumference thereof,
   said frame consisting of two portions at least approximately symmetrical about the plane of said disc,
   said two frame portions being disposed on opposite sides of said plate in engagement with the corresponding sides of said plate,
   common fixation means for securing said frame portions to each other and to said plate,
   two friction pads disposed on opposite sides of said disc, respectively, one of said two pads being located inside said cup-shaped piece, said pads having sides by which they are guided in said frame,
   said brake frame having surfaces corresponding to and cooperating with said sides of said friction pads for guiding said friction pads in movement transverse to said disc so that said pads can frictionally engage said disc,
   means for moving each of said friction pads with respect to said brake frame to have said disc caught tightly between said pads,
   said sides of said pads being parallel to each other and parallel to a plane passing through the axis of rotation of said disc and the center of the corresponding pad,
   said arms of said cup-shaped piece being spaced apart at the level of said pad which is inside said cup-shaped piece, by a distance which is slightly greater than the distance between the parallel sides of said pad which is inside said cup-shaped piece, said corresponding surfaces of said brake frame which cooperate with said parallel sides of said friction pads also being parallel, each pad defining at least two elongated recesses the long axes of which extend parallel with the axis of the disc and with said recesses being spaced peripherally with respect to said disc, and the corresponding frame portion being provided with parts projecting into said recesses and engaging therewith to prevent radial displacement of said pads with respect to said frame portion while permitting displacement normal to the plane of said disc, said projecting parts being adapted to be disengaged from said recesses to permit the removal of said friction pads radially from said frame between adjacent arms of said cup-shaped piece.

References Cited

UNITED STATES PATENTS

| | | | |
|---|---|---|---|
| 3,357,524 | 12/1967 | Smith | 188—73 |
| 3,055,456 | 9/1962 | Pfeiffer | 188—73 |
| 3,077,246 | 2/1963 | Redmayne et al. | 188—73 |
| 3,220,513 | 11/1965 | Hodkinson | 188—73 |
| 3,249,181 | 5/1966 | Muller | 188—73 |
| 3,261,430 | 7/1966 | Willson et al. | 188—73 |
| 2,497,438 | 2/1950 | Butler | 188—152 |
| 2,840,193 | 6/1958 | Mann et al. | 188—73 |
| 2,843,225 | 7/1958 | Miller | 188—73 |
| 3,122,221 | 2/1964 | Von Rucker | 188—73 XR |

FOREIGN PATENTS

| | | |
|---|---|---|
| 1,161,158 | 1/1964 | Germany. |
| 871,308 | 6/1961 | Great Britain. |

GEORGE F. A. HALVOSA, *Primary Examiner.*